United States Patent [19]  [11] 4,024,225
Chiang  [45] May 17, 1977

[54] METHOD OF MAKING HIGH PURITY ALKALI METAL PHOSPHATES FROM WET-PROCESS PHOSPHORIC ACID

[75] Inventor: Peter T. Chiang, Monroeville, Pa.
[73] Assignee: United States Steel Corporation, Pittsburgh, Pa.
[22] Filed: July 28, 1975
[21] Appl. No.: 599,432

Related U.S. Application Data

[63] Continuation-in-part of Ser. No. 412,077, Nov. 2, 1973, abandoned.
[52] U.S. Cl. .............................. 423/305; 210/21; 423/315; 423/321 S
[51] Int. Cl.² ...................................... C01B 15/16
[58] Field of Search .......... 210/21; 423/321 S, 309, 423/320, 313, 355, 305, 315; 71/34

[56] References Cited

UNITED STATES PATENTS

| | | | |
|---|---|---|---|
| 3,707,357 | 12/1972 | Chiang | 423/321 S X |
| 3,767,769 | 10/1973 | Winand et al. | 423/321 S X |
| 3,867,511 | 2/1975 | Chiang et al. | 423/321 S |
| 3,914,382 | 10/1975 | Williams | 423/321 S |

Primary Examiner—Frank A. Spear, Jr.
Attorney, Agent, or Firm—William L. Krayer

[57] ABSTRACT

Wet-process phosphoric acid is partially purified by extraction with an organic solvent followed by scrubbing with a portion of the aqueous phosphoric acid from a water-stripping unit, then water-stripping and base-stripping. At the water-stripping stage, all the remaining impurities and approximately two-thirds of the $P_2O_5$ are transferred from the organic to the aqueous phase, which renders the other one-third $P_2O_5$, subsequently recovered by base-stripping, essentially free of impurities. The bulk of the aqueous phosphoric acid from the water-stripping is purified further by precipitating the impurities with an alkali metal hydroxide or carbonate. The precipitate is filtered off and the filtrate used for base-stripping. The resulting aqueous solution from base-stripping is adjusted to a desired alkali metal-to-phosphate ratio and used for manufacture of high purity alkali metal phosphate in general and particularly sodium tripolyphosphate.

8 Claims, 1 Drawing Figure

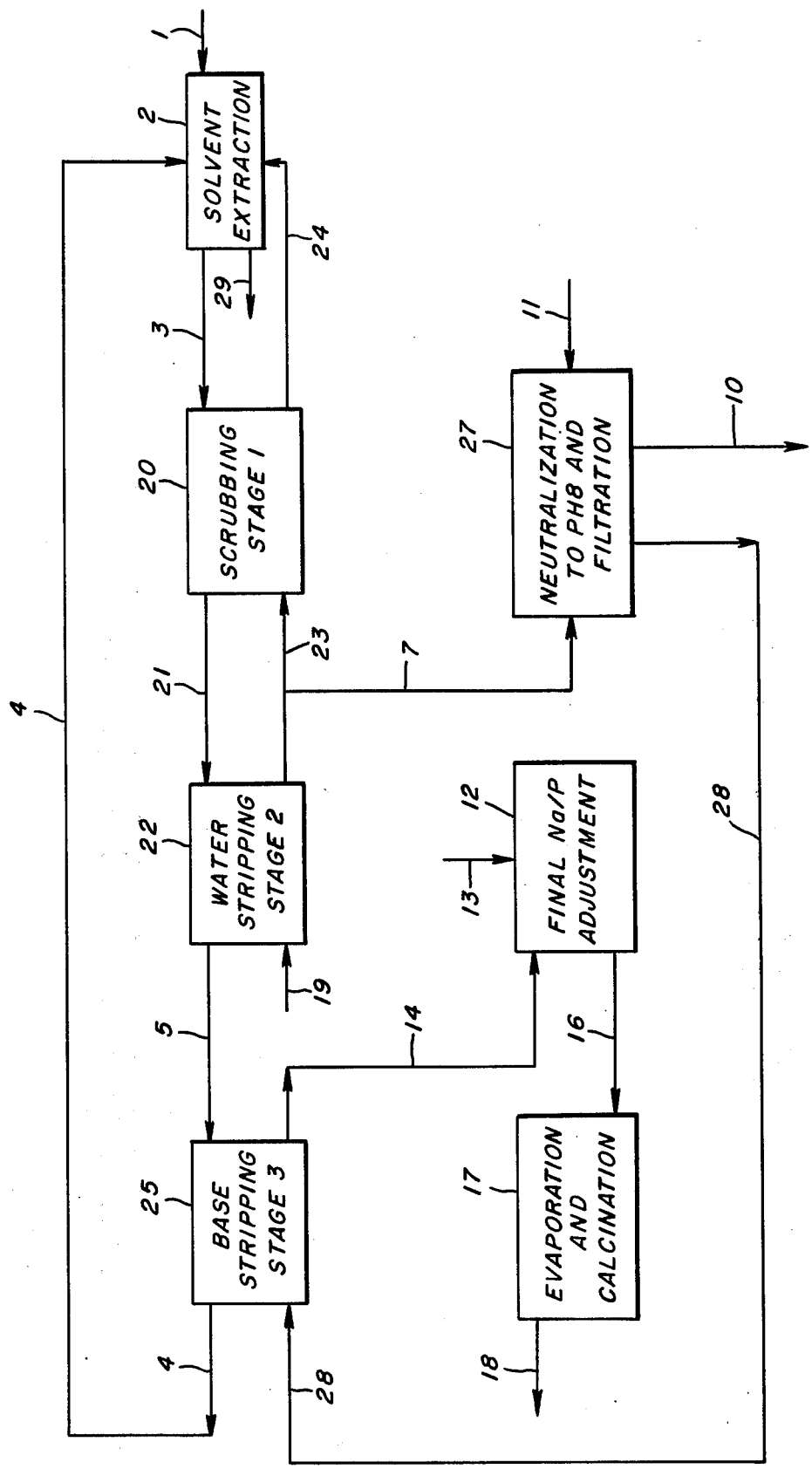

METHOD OF MAKING HIGH PURITY ALKALI METAL PHOSPHATES FROM WET-PROCESS PHOSPHORIC ACID

This is a continuation-in-part of my application Ser. No. 412,077, filed Nov. 2, 1973, now abandoned.

BACKGROUND OF THE INVENTION

The production of sodium tripolyphosphate ($Na_5P_3O_{10}$) from wet-process phosphoric acid ($H_3PO_4$) suitable for industrial uses requires removal of impurities such as iron (Fe), aluminum (Al), magnesium (Mg), calcium (Ca), fluorine (F), and sulfuric acid ($H_2SO_4$). The removal of these impurities represents a major technical problem. Several published approaches are summarized below.

In the most common practice, impurities of wet-process phosphoric acid (30 percent $P_2O_5$) are precipitated to a varying extent by neutralization with either sodium hydroxide (NaOH) or sodium carbonate ($Na_2CO_3$).

In another method, wet-process phosphoric acid (30 percent $P_2O_5$) is neutralized with ammonia ($NH_3$) to the level of monoammonium phosphate ($NH_4H_2PO_4$), thereby precipitating most of the impurities. After separating the precipitate, the solution is treated with sodium hydroxide to crystallize sodium ammonium phosphate ($NaNH_4HPO_4$). After their separation, these crystals are dissolved by heating with sodium hydroxide solution at such a ratio that a crystal mixture of $NaH_2PO_4 + 2Na_2HPO_4$ results.

In a further method, (U.S. Pat. No. 3,574,535) wet-process phosphoric acid (30 percent $P_2O_5$) is extracted with n-butanol. The organic phase, consisting of n-butanol, phosphoric acid, water, and some extracted impurities are neutralized with a sodium carbonate or sodium hydroxide solution to obtain a mixture of one mole of monosodium phosphate ($NaH_2PO_4$) per two moles of disodium phosphate ($Na_2HPO_4$). The crystal suspension which contains that portion of the impurities originally extracted to the butanol phase is separated from the latter by decantation, dried, and calcined.

Impure sodium tripolyphosphate manufactured from wet-process phosphoric acid is purified either by recrystallizing the sodium tripolyphosphate or by washing the sodium tripolyphosphate with a small amount of water to dissolve the impurities together with a portion of the sodium tripolyphosphate (U.S. Pat. No. 3,391,990).

Impurity removal from relatively dilute wet-process phosphoric acid by neutralization or by n-butanol extraction alone usually does not furnish a sodium tripolyphosphate product suitable for many applications requiring high purity. Recrystallization either at the sodium phosphate stage or at the sodium tripolyphosphate stage improves the purity of the product at the expense of lower phosphate recovery.

SUMMARY OF THE INVENTION

My invention relates to the preparation of high-purity alkali metal phosphates from wet-process phosphoric acid by combining solvent extraction of the acid with a special stripping and neutralization technique in such a manner that the impurity rejections are very high, while the yield of purified phosphate remains economically attractive. The wet-process phosphoric acid may contain from 50 to 56% $P_2O_5$; however, lower concentrations (as low as 30% $P_2O_5$) can be used at the cost of lower purified phosphate recovery. A practical range of $P_2O_5$ content is from 40 to 58% $P_2O_5$. The process is particularly applicable to the preparation of sodium tripolyphosphate, $Na_5P_3O_{10}$; however, this is not intended to limit the scope of my invention as it will become clear to those skilled in the art that other alkali metal phosphates can also be prepared; in particular, my invention can be used to prepare any high purity alkali metal phosphate having a molar ratio of alkali metal to phosphorus of from 1.3:1 to 3:1.

The first step of the process is a solvent extraction system in which the $P_2O_5$ values are extracted from concentrated (40 – 58% $P_2O_5$) wet-process phosphoric acid into an organic solvent selected from n-hexanol, n-heptanol, n-octanol, iso-octanol and mixtures thereof in amounts from about ½ to about 4 parts by weight for each part by weight of phosphoric acid, to form a $P_2O_5$-loaded alcohol extract. This step is similar to that disclosed by Peter T. Chiang and J. D. Nickerson, in U.S. Pat. No. 3,867,511, which is incorporated herein by reference. The aqueous raffinate from the extraction retains about 60 percent of the original iron, 80 percent of the original aluminum, 90 percent of the original magnesium, 80 percent of the original fluorine, and 15 – 25 percent of the original $P_2O_5$.

My process continues with further purification of the $P_2O_5$-loaded organic solvent by scrubbing with a portion of the dilute phosphoric acid from a water stripping unit, water stripping, and base stripping followed by neutralization of the resulting aqueous acid from water stripping, and filtering. The organic extract is stripped with water to transfer almost all the impurities and approximately two-thirds of the $P_2O_5$ to the aqueous phase. This renders the other one-third $P_2O_5$, subsequently recovered by base stripping, essentially free of impurities. The rest of the aqueous phosphoric acid obtained from the water stripping is purified further by precipitating the impurities with an alkali metal hydroxide or carbonate. The precipitate is filtered off and the filtrate used for base stripping. The resulting aqueous solution from the base stripping is adjusted to a desired alkali metal-to-phosphate ratio and converted to the corresponding alkali metal phosphate.

The limiting factor of the impurity level at the neutralization-purification step is the solubility of each impurity. Consequently, the method which confines the impurities in the smallest possible stream volume gives the highest level of purification. This is accomplished by the above described combination of water stripping and base stripping, illustrated in the drawing. It provides a better means of purification than the conventional stripping and/or neutralization method.

As illustrated in the drawing, a scrubbing and water stripping step is used prior to the base stripping step. The iron, aluminum and especially magnesium contents of the product are reduced, and the impurity-rich aqueous phosphoric stream from the scrubbing stage is recycled to the extraction circuit to minimize the loss in phosphate yield.

Also, use is made of the filtrate obtained from the neutralization step. This filtrate, a phosphate solution having a molar ratio of alkali metal to phosphorus of from 1.3:1 to 3.0:1, preferably 2.0:1, is used as the stripping reagent at the base stripping step. Consequently, the final alkali metal phosphate solution is lower in water content than that produced by conventional stripping with water or with a solution of alkali hydroxide, and the evaporation cost in converting to the final product is reduced.

The drawing is a flow sheet for my basic invention, used to make sodium tripolyphosphate, in which filtrate from the neutralization step is used in the base stripping step.

Referring now to the drawing, wet-process phosphoric acid in line 1 is fed to the final stage of a staged solvent extraction step 2, and the $P_2O_5$-loaded solvent (line 3) therefrom (typically heptanol containing 20 percent $P_2O_5$) is first scrubbed with dilute phosphoric acid (line 23) in scrubber 20 at an extract-to-acid weight ratio from 15:1 to 30:1, preferably 20:1 to remove from 5 – 15 percent of the $P_2O_5$ as acid and from 50 – 80% of the impurities from the organic phase. The aqueous acid feedstream 23 to the scrubber 20 constitutes from 10 to 30% of the aqueous discharge 7 from the water stripping stage. The function of the scrubbing stage 20 is to remove the impurities, mainly magnesium, from the extract. The aqueous $H_3PO_4$ stream from the scrubbing stage is recycled 24 to the extraction section 2. The scrubbed extract 21 is then subjected to water 19 stripping in the second stage 22 at a extract-to-water weight ratio from 5:1 to 7:1, preferably 5.5:1. The major part of the aqueous acid stream, withdrawn from the second stage 22, is sent by line 7 to be neutralized at 27 to a pH of 5–8 with a sodium hydroxide or sodium carbonate solution, line 11, and filtered. Precipitation at the lower end of the given pH range gives optimum aluminum rejection, while a higher pH favors iron and magnesium rejections. The purified filtrate containing disodium phosphate is then fed through line 28 to the third stage 25 to remove the remaiing phosphoric acid from the organic extract stream 5. The aqueous stream withdrawn at line 14 from the last stripping stage 25 is adjusted 12 to a Na/P mole ratio of 1.67 with sodium hydroxide or carbonate 13, removed 16, evaporated to dryness, and calcined 17 to sodium tripolyphosphate 18. The disodium phosphate-stripped heptanol in line 4 is recycled to the extraction section 2.

The filter cake (line 10) is either discarded or combined with the raffinate (line 29).

Since the impurities have a very strong affinity toward the aqueous phase in alcohol ($C_6$-$C_8$)-$H_3PO_4$-$H_2O$ systems, the above scrubbing and stripping arrangement, when using an alcohol as a solvent, distributes all of the remaining impurities and typically about two-thirds of the total $P_2O_5$ to the aqueous acid phase at the water-stripping stage 22. This renders the rest of the $P_2O_5$, typically about one-third, subsequently recovered by base stripping at 25, essentially free of impurities. The partially stripped extract passing through line 5 is subsequently stripped at 25 with a phosphate solution having a molar ratio of alkali metal to phosphorus of about 1.3:1 to 3.0:1 from line 28 in a one-stage operation.

The invention is further described by the following example:

EXAMPLE I

Following the procedure of the drawing, a five-hour continuous extraction-stripping operation was made using a three-stage extraction and three-stage stripping equipment. The extraction section was operated countercurrently at 30° C, using North Carolina 54 percent $P_2O_5$ green wet-process phosphoric acid (22.3 milliliters per minute) as feed and recycle n-heptanol (65.0 milliliters per minute) as solvent. The stripping section was operated with one water-stripping stage and one base-stripping stage, using a solution of disodiumphosphate. The temperatures recorded were about 30° C for the water-stripping stage and 60° C for the base-stripping stage. The average flow-rates for the water at 24° C was 11.8 milliliters per minute. The average withdrawal rate of the aqueous phosphoric acid stream from the water-stripping stage was 17.1 milliliters per minute, which amounted to about 87 percent of the total aqueous acid stream. During the five-hour period a total of 15.2 kilograms of purified sodium phosphate solution (28,2% $P_2O_5$), 4.26 kilograms of raffinate (32.2% $P_2O_5$), and 1.12 kg of wet filter cake (14.0% $P_2O_5$) were collected from a feed of 11.27 kilograms of wet-process phosphoric acid, 3.54 kilograms of water and 8.84 kilograms of sodium hydroxide solution (50 %).

Stream and product compositions are listed in Table I below. The composition of the $Na_5P_3O_{10}$ was calculated from the analysis of the sodium phosphate solution.

Table I

| Sample Origin | Chemical Analysis, Wt. % | | | | |
|---|---|---|---|---|---|
| | $P_2O_5$ | $Fe_2O_3$ | $Al_2O_3$ | MgO | F |
| Feed Acid | 53.9 | 1.51 | 0.63 | 0.92 | 0.41 |
| Sodium Phosphate Solution | 28.2 | 0.0140 | 0.0070 | 0.0028 | 0.08 |
| $Na_5P_3O_{10}$ | 57.0 | 0.0296 | 0.0168 | 0.0056 | 0.16 |
| Filter Cake (32% solids) | 14.0 | 2.41 | 0.143 | 0.364 | 0.26 |
| Raffinate | 32.2 | 2.80 | 1.32 | 2.19 | 0.86 |

I do not intend to be restricted to the above particular illustrations and descriptions of my invention. It may be otherwise variously practiced within the scope of the following claims.

I claim:

1. Method of preparing high-purity alkali-metal phosphate comprising:
   a. extracting a portion of the $P_2O_5$ in a wet-process phosphoric acid containing 40 – 58% $P_2O_5$ with an essentially water-immiscible alcohol selected from the group consisting of n-hexanol, n-heptanol, n-octanol, iso-octanol and mixtures thereof in an amount from about one-half to about four parts by weight for each part by weight of wet-process phosphoric acid,
   b. recovering $P_2O_5$ in a stripping process comprising the steps of
      i. scrubbing the $P_2O_5$-loaded alcohol extract with a portion of the aqueous phosphoric acid solution from water stripping step (b) ii,
      ii. thereafter stripping the $P_2O_5$-loaded alcohol extract from the scrubbing step with water to form an aqueous phosphoric acid solution, and
      iii. thereafter stripping the $P_2O_5$-loaded alcohol from the water stripping step (b) ii, with an alkali metal phosphate solution having a molar ratio of alkali metal to phosphorus of from 1.3 to 1 to 3.0 to 1, to form a product solution of alkali metal phosphate having a molar ratio of alakli metal to phosphate of from 1:1 to 1.67:1,
   c. neutralizing a portion of the aqueous phosphoric acid solution formed in water stripping step (b) ii, with sodium hydroxide or sodium carbonate to form a precipitate and an alkali metal phosphate solution having a molar ratio of alkali metal to phosphorus of 1.3 to 1 to 3 to 1, d. removing the precipitate formed during neutralizing step (c), e. recycling the alkali metal phosphate solution from step (c) for use in step (b) iii. as a stripping solution, f. recycling the stripped water-immiscible alcohol from the base stripping step (b) iii. to the extraction step (a), and g. adjusting the ratio of alkali metal to phosphorus in the alkali metal phosphate solution of step (b) iii. to a desired ratio by adding alkali metal hydroxide or alkali metal carbonate thereto.

2. Method of claim 1 in which the aqueous product solution is evaporated to form a solid alkali metal phosphate.

3. Method of claim 1 in which the ratio of alkali metal to phosphorus in the product solution is adjusted with alkali metal hydroxide to achieve a desired ratio.

4. Method of claim 3 in which the molar ratio of alkali metal to phosphorus in the product solution is adjusted to 1.67:1 and calcined to form alkali metal tripolyphosphate.

5. Method of claim 1 in which the impurity-rich aqueous $H_3PO_4$ stream from the scrubbing stage is recycled to the solvent extraction step.

6. Method of claim 5 in which part of the aqueous phosphoric acid from the water-stripping step is neutralized to yield a solution of $Na_2HPO_4$ which is then used as a stripping agent in step c).

7. Method of claim 1 in which the weight ratio of $P_2O_5$-loaded extract to stripping water is from about 5:1 to about 7:1.

8. Method of claim 5 in which the weight ratio of $P_2O_5$-loaded extract to aqueous phosphoric acid in the scrubbing step is from about 15:1 to about 30:1.

* * * * *

UNITED STATES PATENT OFFICE
CERTIFICATE OF CORRECTION

Patent No. 4,024,225                         Dated   May 17, 1977

Inventor(s) Peter T. Chiang

It is certified that error appears in the above-identified patent and that said Letters Patent are hereby corrected as shown below:

Column 4, line 13, change "28,2%" to -- 28.2% --.

Table I, column 3, line 3, change "0.0296" to -- 0.0286 --.

Signed and Sealed this

Eleventh Day of October 1977

[SEAL]

Attest:

RUTH C. MASON
*Attesting Officer*

LUTRELLE F. PARKER
*Acting Commissioner of Patents and Trademarks*